United States Patent
Bliss et al.

(10) Patent No.: US 7,768,730 B2
(45) Date of Patent: Aug. 3, 2010

(54) BASE LINE CONTROL ELECTRONICS ARCHITECTURE

(75) Inventors: William Gene Bliss, Thornton, CO (US); Sian She, Broomfield, CO (US)

(73) Assignee: Broadcom Corporation, Irvine, CA (US)

( * ) Notice: Subject to any disclaimer, the term of this patent is extended or adjusted under 35 U.S.C. 154(b) by 369 days.

(21) Appl. No.: 12/032,045

(22) Filed: Feb. 15, 2008

(65) Prior Publication Data

US 2008/0266693 A1 Oct. 30, 2008

Related U.S. Application Data

(60) Provisional application No. 60/999,766, filed on Apr. 30, 2007.

(51) Int. Cl.
G11B 5/09 (2006.01)
(52) U.S. Cl. .................................................. 360/32
(58) Field of Classification Search .................. 360/32, 360/46, 61, 67, 68, 75; 375/355, 375, 233, 375/341
See application file for complete search history.

(56) References Cited

U.S. PATENT DOCUMENTS

| | | | | |
|---|---|---|---|---|
| 5,768,320 A * | 6/1998 | Kovacs et al. | ............... | 375/341 |
| 5,940,257 A * | 8/1999 | Zavis | ........................... | 361/42 |
| 6,600,779 B1 * | 7/2003 | Sawada et al. | .............. | 375/233 |
| 7,023,946 B2 * | 4/2006 | Sawada et al. | .............. | 375/375 |
| 7,466,782 B1 * | 12/2008 | Patapoutian | ................. | 375/355 |
| 7,498,882 B2 * | 3/2009 | Dally et al. | ................. | 330/279 |
| 2003/0067975 A1 * | 4/2003 | Yamakura et al. | ........... | 375/233 |
| 2009/0207517 A1 * | 8/2009 | Bliss | ........................... | 360/32 |

* cited by examiner

*Primary Examiner*—Fred Tzeng
(74) *Attorney, Agent, or Firm*—Garlick Harrison & Markison; Robert A. McLauchlan, III (57) ABSTRACT

A read channel in that reads data from a magnetic storage media. An analog signal produced by passing a read head over magnetic storage media is amplified to match the range of an analog to digital converter (ADC) range. A baseline adjustment is performed on the amplified analog signal to center the amplified analog signal to a midscale of the ADC, which may be based on an error feedback signal and/or a decision feedback signal. Read channel compensation may then be performed after the baseline adjustment has been applied. The read channel compensated analog signal is sampled with the ADC to produce a digital signal. This digital signal may be filtered and a bit sequence may then be detected from the filtered digital signal. The EFB signal and/or the DFB signal may be produced in the digital domain based on the digital signal and the detected bit sequences.

21 Claims, 8 Drawing Sheets

BASE LINE CONTROL ELECTRONICS ARCHITECTURE

CROSS REFERENCE TO RELATED APPLICATIONS

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes: 1. U.S. Provisional Application Ser. No. 60/999,766, entitled "BASE LINE CONTROLLER ELECTRONICS ARCHITECTURE," filed Apr. 30, 2007, pending.

TECHNICAL FIELD OF THE INVENTION

Embodiments of the present invention relate generally to memory storage devices; and, more particularly, embodiments of the present invention relate to signal processing within a magnetic read channel.

BACKGROUND OF THE INVENTION

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

The structure and operation of hard disk drives is generally known. Hard disk drives include, generally, a case, a hard disk having magnetically alterable properties, and a read/write mechanism including Read/Write (RW) heads operable to write data to the hard disk by locally altering the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. Data stored on the disks may be accessed by moving RW heads radially as driven by a head actuator to the radial location of the track containing the data. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

With increases in data density stored to the hard disk, the effects of noise components within the analog portion of the read channel are increased. Typically, read channel compensation is performed in the analog domain.

Further limitations and disadvantages of conventional and traditional read channel signal processes and related functionality will become apparent to one of ordinary skill in the art through comparison with the present invention described herein.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGS., like numerals being used to refer to like and corresponding parts of the various drawings. Advantages and features of embodiments of the present invention may become apparent from the description, accompanying drawings and claims.

Embodiments of the present invention provide a read-channel integrated circuit (IC) for use within a hard disk drive (HDD). Embodiments of the present invention provide a system and method to read data from magnetic storage media with an analog front end (AFE) coupled to a sequence detector operable to produce a bit sequence read from the magnetic media. This involves passing a read head over a magnetic storage media to produce an analog signal. This may be done within a hard disk drive or other like storage media. The analog signal may then be amplified such that the range of the amplified analog signal substantial matches a range of the ADC used to sample the analog signal. Next a baseline adjustment is performed on the amplified analog signal to remove DC content or center the amplified analog signal to a midscale of the ADC. This baseline adjustment may be performed using feedback from an error feedback (EFB) loop and decision feedback (DFB) loop. The amplified analog signal may be sampled (or over sampled). A digital signal may then be produced from the amplified analog signal where this signal is filtered to match signal characteristics for bit detection. The digital signal is then provided to a sequence detector which will produce a bit sequence from the digital signal. The digital signal and/or bit sequence may be used to produce the EFB signal and/or DFB signal used to perform the baseline adjustment.

In some embodiments, the baseline adjustment is injected prior to compensation for magnetic resistive asymmetry (MRA) and continuous time filter (CTF) processing. Embodiments of the present invention are operable to leverage the advantages of digital signal processing and apply these advantages to signal processing to address latency issues that previously occurred in the analog domain. This can result in improved performance and reduced costs associated with the read channel circuitry.

Dramatic improvements have been made in signal-to-noise ratio (SNR), enabling accurate, reliable recovery of user data from noisy analog signals. Hard drive designers have taken advantage of SNR improvements to make data tracks on a storage disk smaller and pack those tracks tighter. This enables real densities of up to 80-gigabytes-per-platter in desktop-level drives (3.5-inch platters), 40-gigabytes-per-platter in mobile drives (2.5-inch platters) and increased capacity in small-form-factor consumer device drives (1-inch and smaller).

Figure 1:
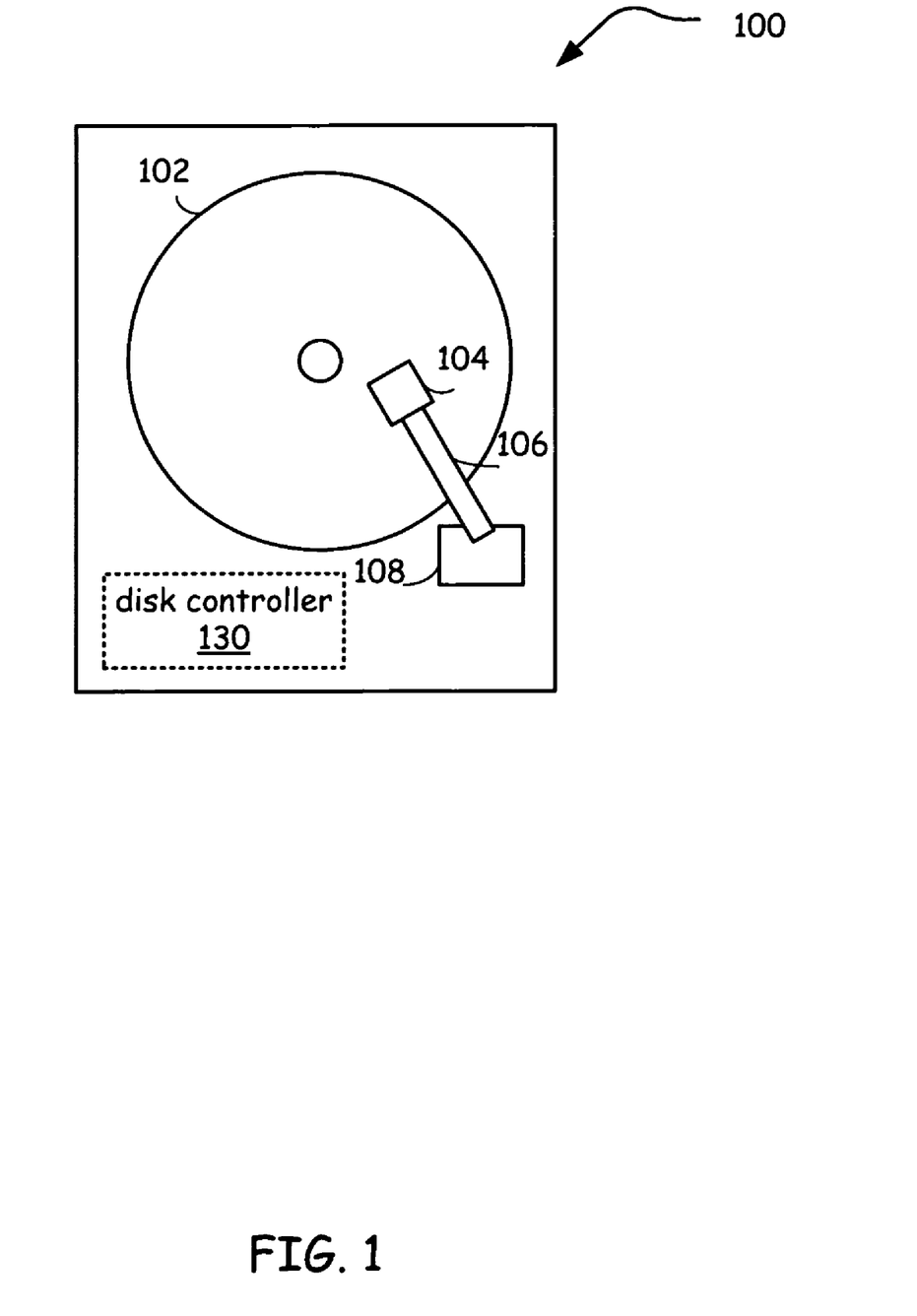
FIG. 1 depicts an embodiment of a disk drive unit in accordance with an embodiment of the present invention.

FIG. 1 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write (RW) heads 104 that are coupled to arm 106 that is moved by actuator 108 over the surface of the disk 102 either by translation, rotation, or both. The head assembly may also be referred to as a head gimbal assembly (HGA) that positions a RW head, which in some embodiments may be a thin-film magnetic head, to record and read magnetic information into and from a recording surface of a hard disk or recording medium rotating at high speed. Pre-amplifier (within the RW head or located between the RW head and the disk controller) may be used to condition the signals to and from the RW head. Disk controller 130 is included for controlling the read and write operations to and from the drive, for controlling the speed of the servo motor and the motion of actuator 108, and for providing an interface to and from the host device.

Figure 2:
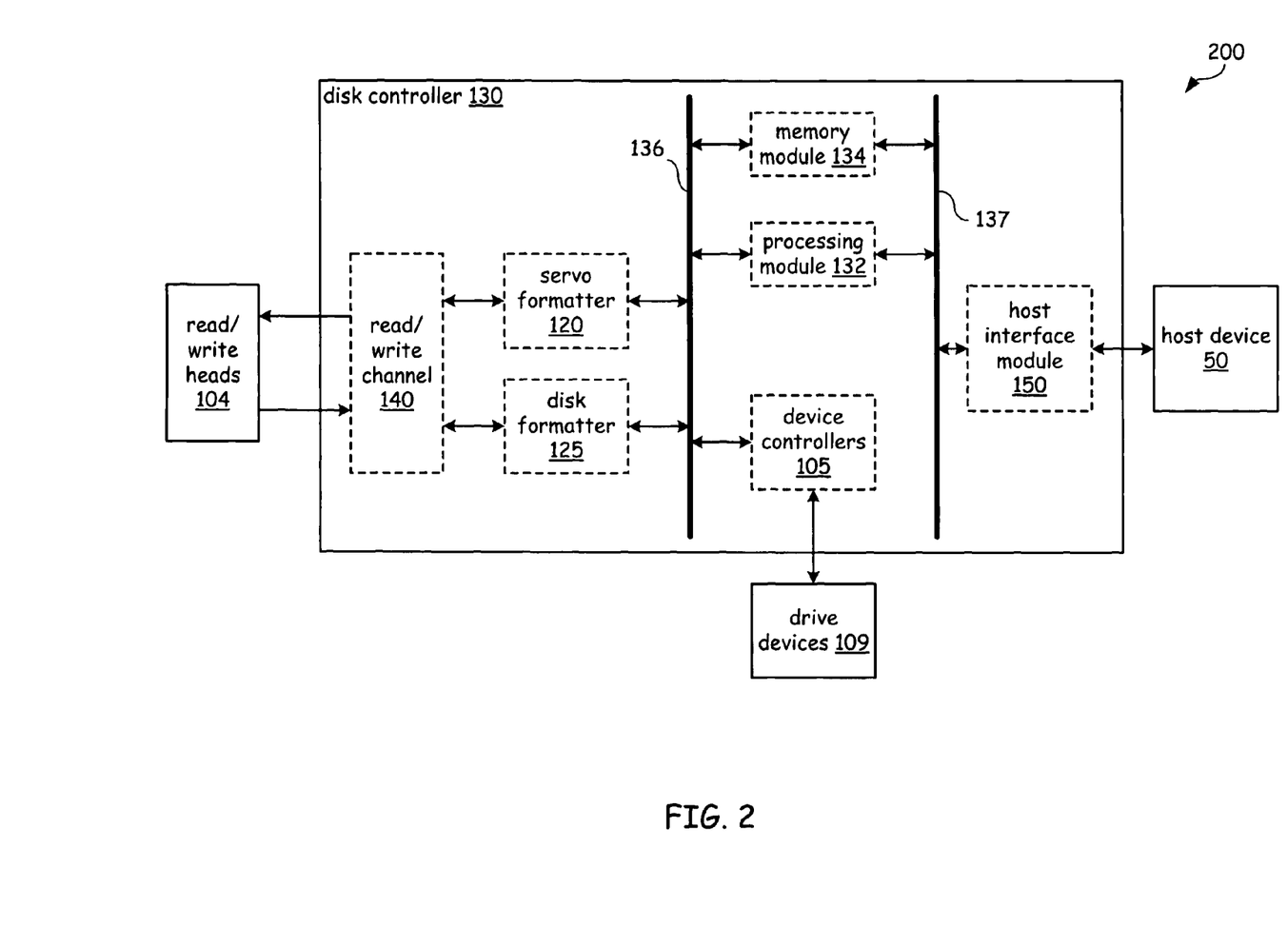
FIG. 2 illustrates an embodiment of a disk controller in accordance with an embodiment of the present invention.

FIG. 2 illustrates an embodiment of an apparatus 200 that includes a disk controller 130. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102. Servo formatter 120 provides clock signals and other timing signals based on servo control data read from disk 102. Device controllers 105 control the operation of drive devices 109 such as actuator 108 and the servo motor, etc. Host interface 150 receives read and write commands from host device 50 and transmits data read from disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes, or functions in order to provide fault tolerance or redundancy. Alternatively, the function, steps, and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, and servo formatter 120 that are interconnected via bus 136 and bus 137. The host interface 150 can be connected to only the bus 137 and communicates with the host device 50. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk controller 130 are implemented as part of a system on a chip (SoC) integrated circuit. In an embodiment, this SoC integrated circuit includes a digital portion that can include additional modules such as protocol converters, linear block code encoding and decoding modules, etc., and an analog portion that includes device controllers 105 and optionally additional modules, such as a power supply, etc. In a further embodiment, the various functions and features of disk controller 130 are implemented in a plurality of integrated circuit devices that communicate and combine to perform the functionality of disk controller 130.

When the drive unit 100 is manufactured, disk formatter 125 writes a plurality of servo wedges along with a corresponding plurality of servo address marks at equal radial distance along the disk 102. The servo address marks are used by the timing generator for triggering the "start time" for various events employed when accessing the media of the disk 102 through read/write heads 104.

Figure 3A:
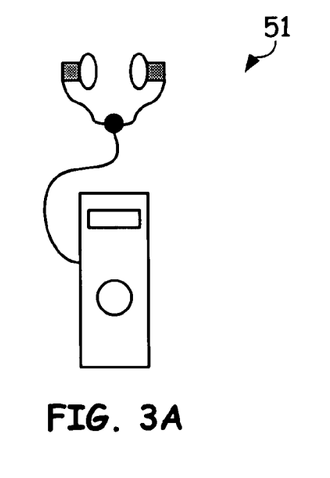
FIGS. 3A through 3E depicts embodiments of various devices that employ disk drive units in accordance with an embodiment of the present invention.

FIG. 3A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 3B:
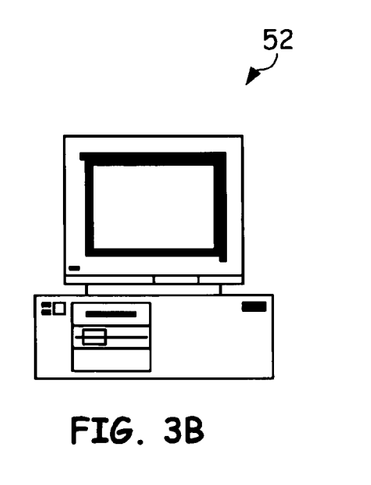

FIG. 3B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 3C:
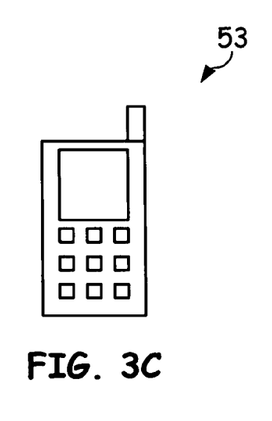

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 3D:
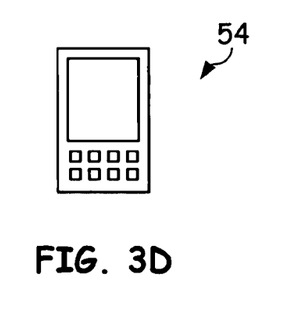

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 3E:
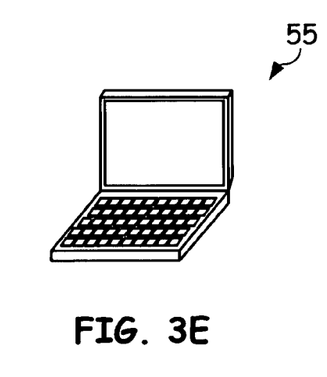

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Data recorded on magnetic disk platters in a drive follow a complex analog path from being initially "read" to final digitization in a read-channel. The feature-rich analog front end (AFE) of a read channel integrates multiple technologies in a single design used for horizontal (also known as longitudinal) recording techniques and higher capacity perpendicular recording. However, perpendicular recording may exhibit increased asymmetry when compare to horizontal recording which is symmetric with even symmetry. This may increase the processing demands placed on the AFE.

A sector is written with a preamble, sync mark, and data. The preamble is constant frequency and the sync mark is a fixed pattern. User data is scrambled with a pseudo-random sequence, encoded, protected with optional added low density parity in block code and pre compensated before being written on the disk as NRZ data, known as non return to zero (NRZ). Servo patterns which are used to position the head on the data track have a similar structure of preamble, SAM (servo address mark), and Gray code with additional, bursts and a repeatable run out field.

Figure 4:
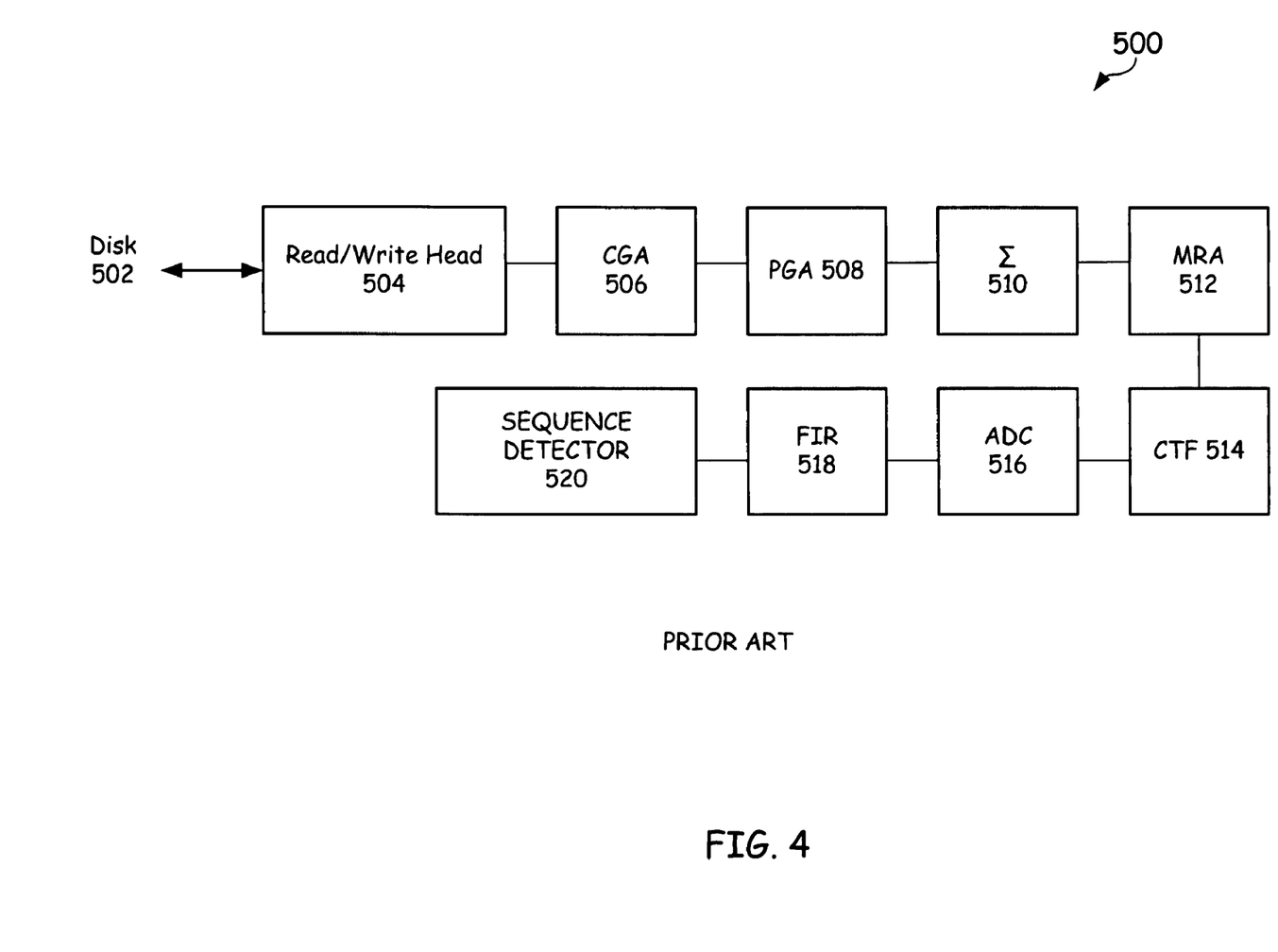
FIG. 4 is a block diagram of a prior art read data path.

FIG. 4 shows a read channel used to read data from a magnetic storage media such as a disk within a HDD. Read channel 500 includes a disk 502, read write head 504, constant gain amplifier (CGA) 506, programmable gain amplifier (PGA) 508, summing module 510, magnetic resistive asymmetry (MRA) correction module 512, continuous time filter (CTF) 514, analog to digital converter (ADC) 516, finite impulse response (FIR) filter 518, and sequence detector 520.

"Reading" a signal in a hard disk drive begins at the media (the drive's storage platter 502) and read write head 504. Read write head 504 includes a head transducer. The head transducer is located prior to a preamp in the data path. The head transducer output is driven from magnetic data pattern previously written on a rotating disk. The read sensor senses the magnetization in the recording layer of the disk and produces an analog signal as the disk media rotates below the read sensor.

Following the head transducer, a signal travels to the HDD preamplifier IC, which provides gain for the signal output as well as biasing for the head's magnetic sensor. The bias allows better reproduction of the signal's magnetic transitions. The signal, therefore, is amplified by the preamp to maximize the read-channel's capabilities once it arrives at the channel. In addition, the output of the preamplifier is differential to allow any noise pick-up to be common mode on both preamplifier differential signal lines between the preamplifier "located on suspension out by the head—and the read-channel on the drive card. The preamp differential signals travel down the suspension on flex circuit traces to a pressure connection, which transitions the signal to the drive card trace.

The channel can be a single chip or integrated as part of a storage system-on-a-chip (SoC). For this discussion, the channel refers to the core that is used in either application. A channel's chief function is to convert the analog signal presented at the input back into the digital data that has been stored on the disk.

The first stage of the analog front end (AFE) of the channel core consists of a stage to remove DC offset in the signal. This is accomplished through AC coupling and DC baseline correction. The variable gain amplifier (VGA) shown as two separate components constant gain amplifier 506 and programmable gain amplifier 508 provides gain determined by the automatic gain control loop. The main function is to control signal level for optimum performance in the ADC 516. Too much gain can cause the ADC sample values to rail at maximum or minimum ADC levels; too little gain can cause quantization noise to dominate SNR and adversely affect bit error rate performance.

Summing Junction (Σ) 510 adds in any additional DC correction necessary beyond the DC attenuation provided in the AC coupling. The goal of the DC correction is to keep the signal centered on the baseline which will become mid scale for the ADC converter so that the sequence detector 520 trellises will work optimally to determine the sequence bits from the samples presented. This also keeps signal offsets from driving the signal amplitude into saturation.

Magneto resistive asymmetry (MRA) correction module 512 and the continuous time filter (CTF) module 514 operate in the analog domain to linearize the signal prior to the ADC 516. MRA correction works to reconstruct linearity that may have been lost in the head transducer stage during the conversion of the magnetic signal on the disk to an electrical signal at the output of the head. The biasing of the head signal is adjusted to keep the signal in the linear range of the head sensitivity curve. However, if the magnetic signal amplitude changes due to fly height or disk magnetic variation exceeds the head transducer linear range, saturation in the peak or trough of the electrical head signal can occur. The MRA correction uses signal offset to determine the amount of squared signal to add back to restore the positive and negative symmetry of the signal.

The CTF module 514, applied after the MRA correction, provides mid-band peaking to help with achieving the target signal response and keeps the signal energy below the Nyquist rate to minimize any aliases that may occur when the analog signal is converted to a sampled representation. While aliases may not have a large effect on a drive surface's bit error rate performance, they can cause an impact to HDD manufacturing yields.

The ADC block 516 converts an analog signal to digital samples quantized in time and amplitude. The clock used is the output of a digital phase-locked loop, which tracks the channel rate clock frequency. The output of the ADC is used as feedback to control the timing of the digital phase-locked loop as well as the automatic gain control with PGA 508, DC baseline correction in Summing Junction (Σ) 510, and FIR adaptation in FIR filter module 518.

The finite impulse response (FIR) filter module 518 performs filtering to match signal characteristic to the ideal target response for bit detection. As with all sections of the analog front end, the performance of this filter is important to achieve the desired architectural target response.

At the output of the AFE, the signal is in a fully digital form ready for detection by sequence detector 520. Regardless of whether the data was recorded using perpendicular or horizontal techniques, the read channel AFE functions are similar. The sample stream is submitted to the sequence detector 520 to begin decoding in trellises for bit recovery. Once bit recovery is completed, parity post processing can then be performed, followed by decoding the run length limited codes and de-scrambling the resulting sequence. These steps ultimately reveal the original user data.

Embodiments of the present invention substantially address the need to reduce dB loss from the complete system of Base Line Control Code (BLCC) and Base Line Control Electronics (BLCE).

Figure 5:
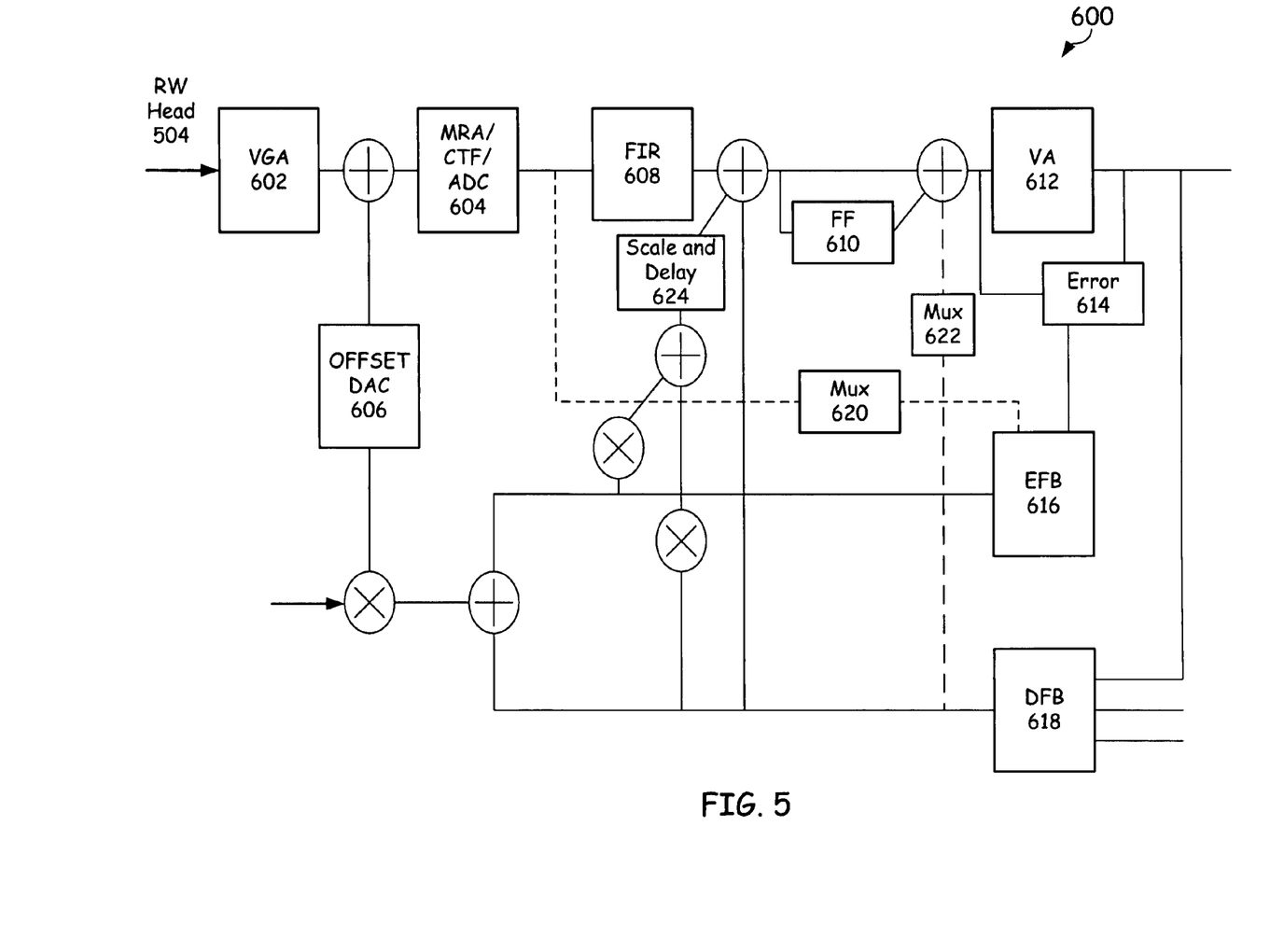
FIG. 5 provides a block diagram in accordance with embodiments in present invention of a baseline correction (BLC) architecture in accordance with embodiments of the present invention.

FIG. 5 provides a block diagram in accordance with embodiments in present invention of a baseline correction (BLC) architecture in accordance with embodiments of the present invention. Baseline Controller 600 includes a variable gain amplifier 602, MRA/CTS/ADC Processing Module 604, offset DAC Module 606, FIR 608, feed forward Filter 610, Viterbi Algorithm processing module (Viterbi detector) or Sequence Detector 612, Error Module 614, Error Feedback Processing Module 616, Decision Feedback Module 618, multiplexers 620 and 622. The analog offset (baseline correction) injection point is located before MRA, because even small errors in baseline hurt MRA Correction significantly. The analog offset includes two components a Decision Feedback (DFB) component and an Error Feedback (EFB) component.

Figure 6:
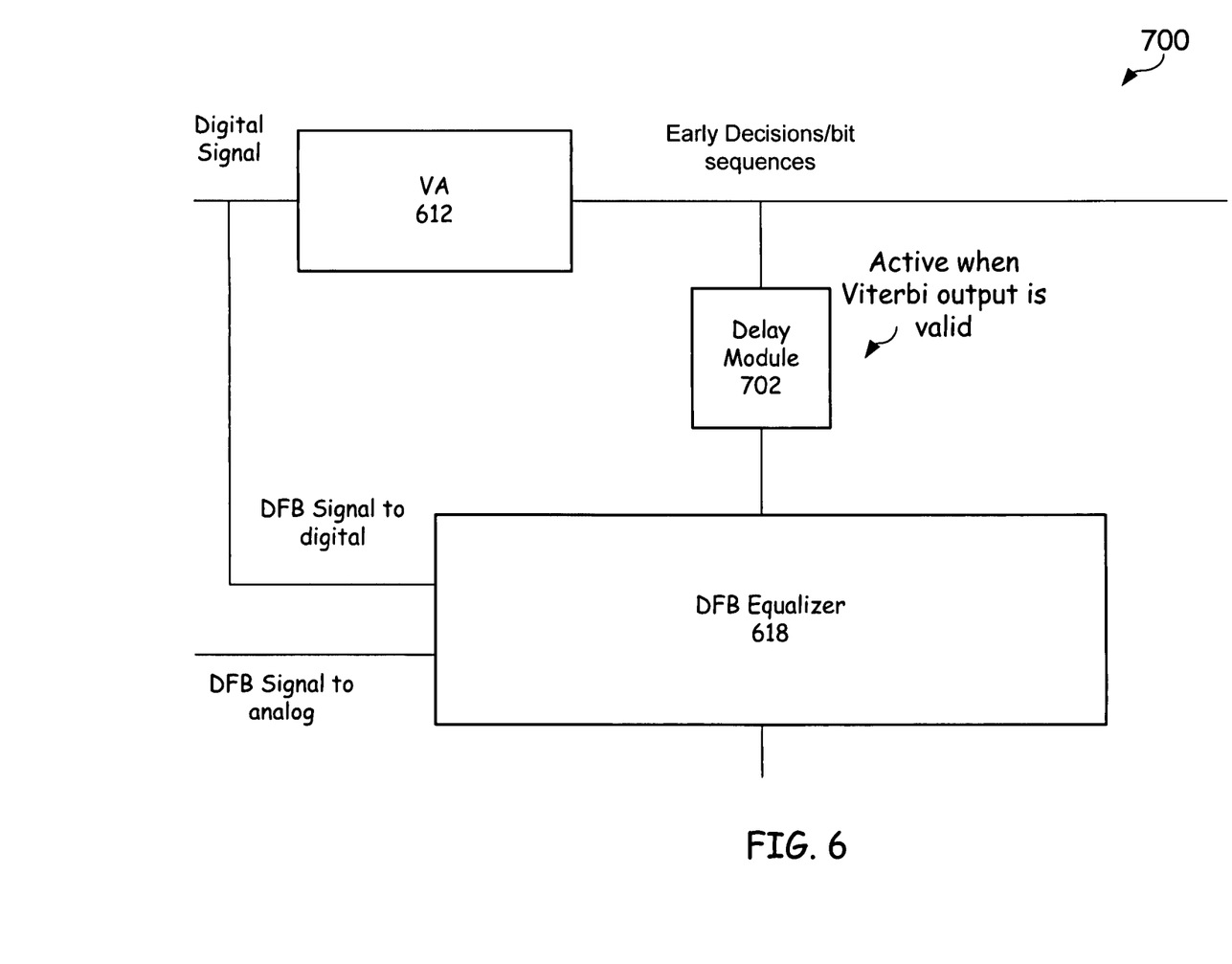
FIG. 6 provides a block diagram of decision feedback equalizer in accordance with embodiments of the present invention.

FIG. 6 provides a block diagram of DFB equalizer 700 in accordance with embodiments of the present invention. Conceptually, the DFB equalizer is operable to subtract out the 'long tails' of error caused by the equivalent analog High Pass Filter. The feedback filter is thus the IIR filter that is just the compliment of the preamp high pass.

A practical limitation of DFB is that one can have very long latency around the analog loop (estimated >=45 bits), and even the 'short loop' around the DDNP-VA with early decisions is relatively long, estimated at >=25 bits. Denoting the loop latency Lv, it is then clear that the first Lv-1 elements of the 'error tail' can't be cancelled with DFB (but the first tail element needs to be incorporated in the PR1 or other PR target). Note that the feedback filter can still be the simple IIR filter, but the filter function is now tempered with a gain term of g1=exp(-L/Tau), where Tau is the time constant of the equivalent HPF in unit delays.

A well understood part of DFE design is to jointly optimize a feed forward filter (FFF) along with the decision driven feedback filter. For simplicity one can assume that the normal FIR achieves a near zero forcing equalization to the desired short target (e.g., PR1) with the expected HPF tail in addition. Note that care must be taken with the adaptive FIR error signal to achieve this (else the FIR could be attempting to cancel the tail in its range of influence). One can then want to solve for the FFF which minimizes the distortion at the VA given the DFB with latency L described above.

The FF filter 610 for these conditions is in general IIR, but for reasonably low poles and/or short DFB latency, is well approximated by a simple to build finite length filter. For one set of conditions the FFF can be well approximated by the first L-1 taps of the ideal response, which is then $Fff(k)=1*delta(k)+2*pi*Fhp*[u(k-1)-u(k-L)]$ This filter can be implemented rather inexpensively with an IIR filter with pole at z=1 (unstable), but being fed by $1-D^L$ (and taking care for no rounding or truncation such that a zero of the input network exactly cancels the unstable pole)

One can expect that FF combined with DFB for the 'standard pole' at $1/1000$ will perform close to optimal given that the a priori single (dominant) pole model is correct (because the BER driving DFB will be low enough).

Figure 7:
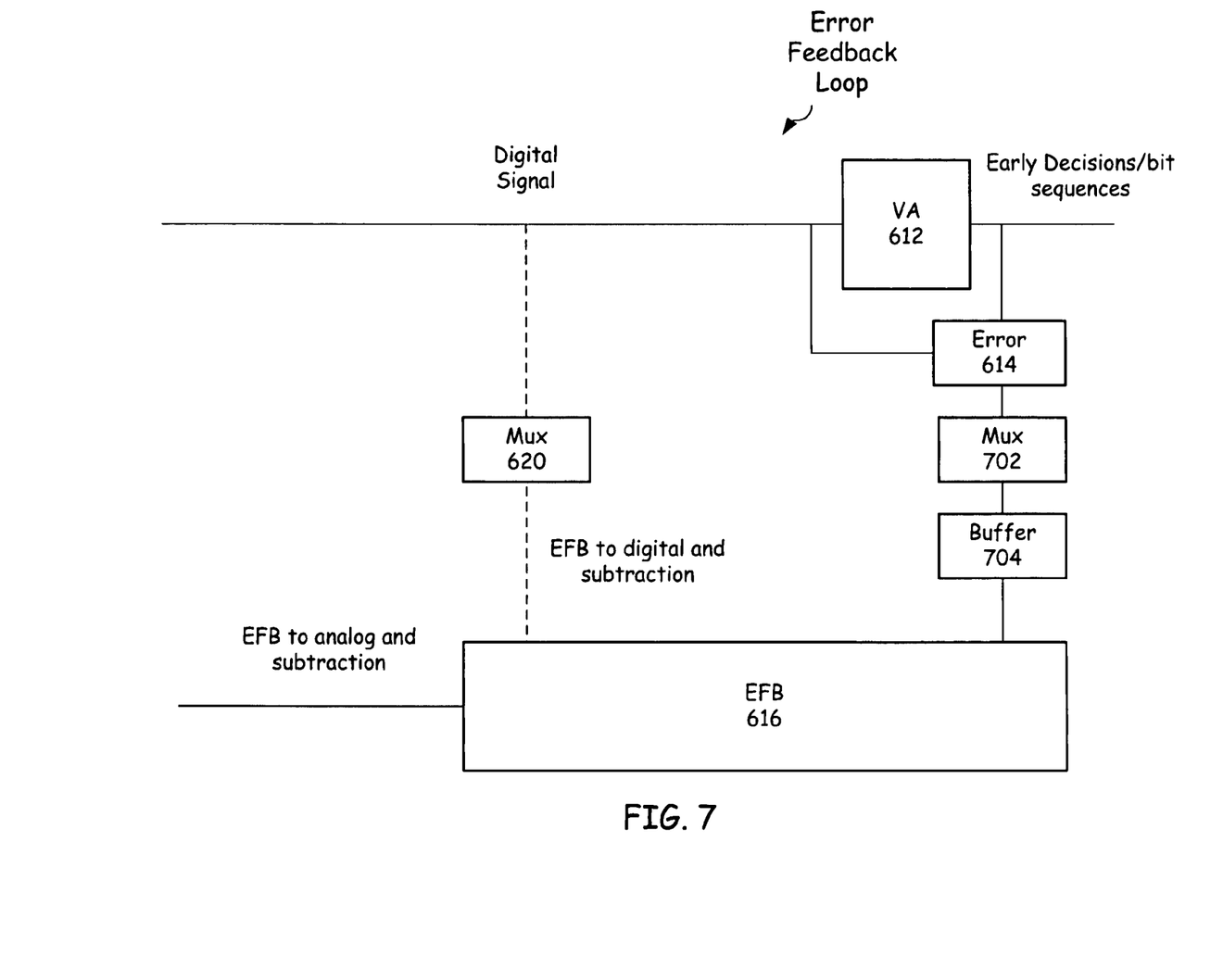
FIG. 7 provides a block diagram and an error feedback module in accordance embodiment of the present invention.

FIG. 7 provides a block diagram and an error feedback loop in accordance embodiment of the present invention. The Error Feedback (EFB) is a simple loop where the relevant error signal (estimate of DC shift=baseline error here) is integrated and fed back.

The digital EFB is a traditional integral control loop with decision directed sample error. This is the same 'sample error' and preliminary decisions which will feed ALL LOOP error gradients (timing, gain, MRA, FIR/Target adapt). The natural point to 'close the loop' is to inject the EFB correction at the input of the VA.

The major advantage over DFB that EFB provides is that EFB is not sensitive to an a priori signal model (there is none). However, a major disadvantage exists in that EFB is limited in ability because of noise enhancement as the bandwidth is increased. In one case, the long latencies of the loop(s) make the achievable bandwidth(s) quite low.

The DFB methods have the inherent advantage that they use the a-priori model of the baseline error (that it comes from a single pole). This is a familiar trend in estimation and detection theory, that full use of such a priori data is needed for optimal performance (and one should note that performance can suffer greatly if such a priori data is wrong.)

During preamble, ADC samples are used to get an initial estimate of the offset. The number of ADC samples typically used is 8. In order not to interfere with the ZPS for the timing loop, one can will collect the same ADC samples as used with ZPS and update the EFB accumulator at the same time.

Embodiments of the present invention provide that the best EFB will be achieved by the loop with the shortest latency, the digital loop (which one can estimate at 20-25 Baud latency), but that the net bandwidth of that loop will be relatively low. Embodiments of the present invention use this EFB loop information in the analog domain as well to improve analog processing, especially to help the MRA correction, and to reduce any static analog offset errors or any other relatively 'slow moving' baselines or offsets. The same correction (properly scaled) may be applied to the analog front end (AFE), and be identically subtracted out before the digital EFB loop. Thus, the digital EFB can run to its full power, while the analog has been helped 'as much as possible'.

The digital EFB with latency >20 will in a noisy environment run with time constant >100 Baud. The fact that the analog EFB injection is skewed by up to 20 Baud will have a net small effect. The first constraint on DC gains is that one can want the same relative amplitude EFB correction applied to the analog as to the digital. By definition the digital EFB is applied with magnitude 1 (the EFB accumulator is added to the VA input). The EFB signal is injected by the offset DAC into the analog domain and must be subtracted out before the 'digital EFB loop'. One can choose to inject the subtraction in the digital domain at the output of the FIR (rather than at the output of the FF), because this leads to implementation simplification, and also because it is a 'better space' than at the FF output.

The subtraction injection must also be delayed by the extra analog 'loop' latency (L_a–L_v) to achieve complete cancellation. (La–Lv) is the time to go from EFB signal through the analog path and reach the add/subtract node at the FIR output. The 'analog' path delay includes:
1. Gain multiplier feeding offset DAC, with DC gain denoted G_off
2. Offset DAC, denoted G_dac
3. MRA correction
4. CTF
5. ADC, where the DC gain of the MRA+CTF+ADC is denoted G_mca
6. FIR, including part of adder tree (down to where EFB is subtracted), where the DC gain of the FIR is denoted G_fir Embodiments of the present invention apply this approach to the DFB loop as well. As shown in FIGS. 5 and 6, a fast digital DFB signal is fed back to the analog domain and also subtracted out before the digital loop. In one embodiment, the DFB core is just a lossy integrator with feedback (1−w), where w is the effective high pass pole in normalized radians, w=2*pi*Fhp/Fadc. Note that while the analog preamp pole will be constant, the 'w' in DFB will change with data rate (Fadc). The lossy integrator is fed directly to the FIR output, (input to Feed Forward Filter). This matches the earlier derivation in that the FF filter works on the remnant error finite latency DFB. In reality the FF filter is a 'small effect' and may be commuted. The DFB lossy integrator must be scaled, and it is cheapest to do so by scaling the early decisions, ak, because they are on {−1, 1}.

The ideal analog DFB has longer latency so it must be further gain scaled by the factor (1−w)^(La−Lv)~=1−w*(La−Lv) which can be easily seen by realizing that the system is further down the exponential tail by the time the feedback arrives.

The subtraction point to cancel out the DFB applied to the analog is also chosen to be the FIR output. The subtraction is just a scaled and delayed version of main DFB signal. The scaling must be exactly the term above, (1−w)^(La−Lv).

Embodiments of the present invention offer many different operating modes. These include but are not limited to:
1. For Perpendicular operations, all loops running.
2. Only analog offset loop is turn on. This is mainly used for Longitudinal operations and possibly for Servo Operations. It is the same as the traditional offset loop. Disable DFB and FF filter. Program 1−w*Lv and 1−w*(La−Lv) to zero. Digital EFB is disabled.
3. Same as 2, except digital EFB is enabled.

One should note that any permutation or combination of EFB/DFB digital and/or analog operating mode is possible.

Figure 8:
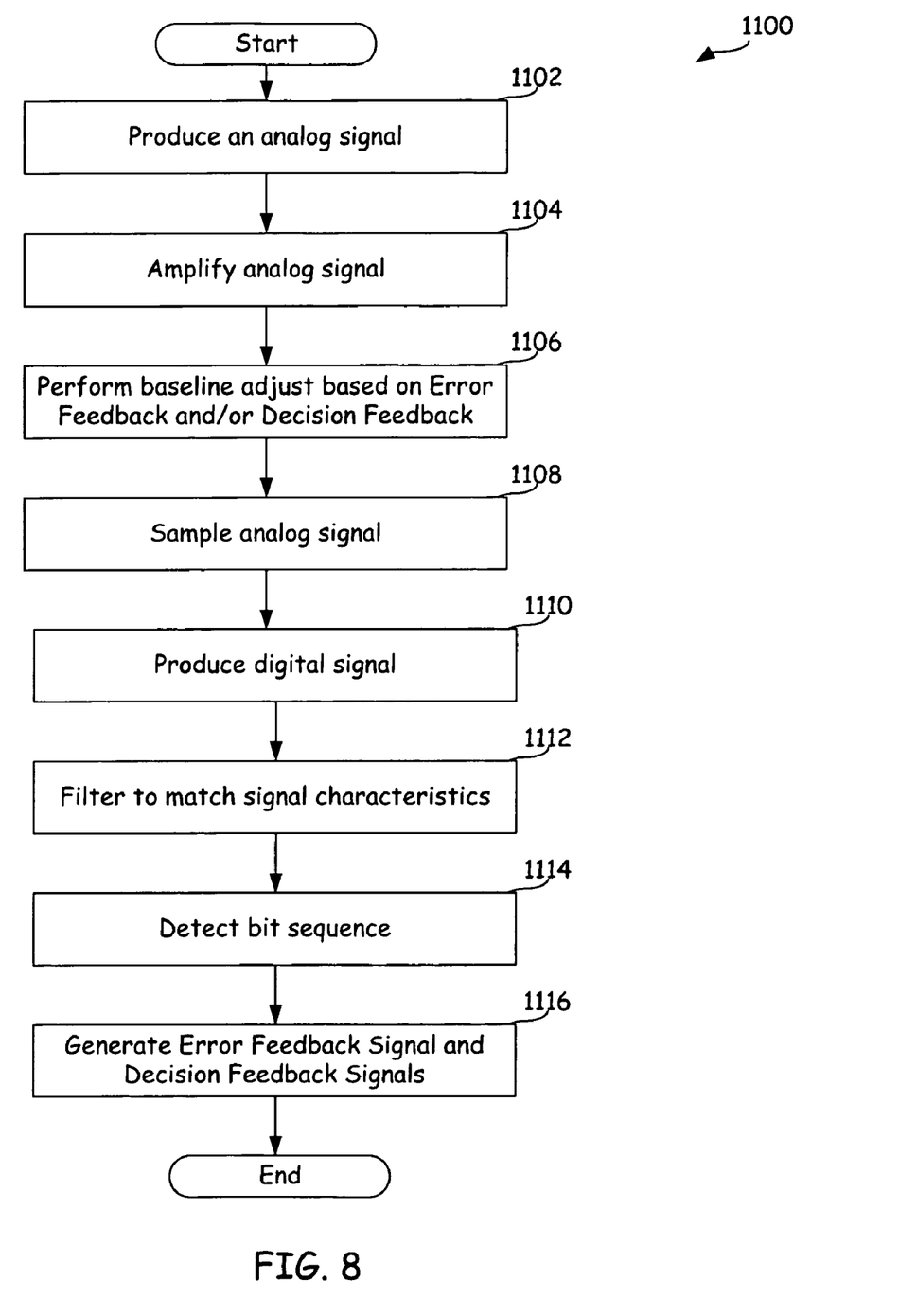
FIG. 8 provides a logic flow diagram associated with a read path that performs base line adjustments and read channel compensation in the analog domain in accordance with the embodiments of the present invention.

FIG. 8 provides a logic flow diagram associated with a read path that performs base line adjustments and read channel compensation in the analog domain in accordance with the embodiments of the present invention. This method reads data from a magnetic storage media in accordance with embodiments of the present invention. The storage media may be a disk within a hard disk drive or other magnetic disk drive known to those having skilled in the art. Operations 1100 begins by passing a read head over a magnetic storage media to produce an analog signal in step 1102. This analog signal may be amplified in step 1104 such that a range of the amplified analog signal substantially matches a range of an ADC to be used within this read path. A baseline adjustment or static offset may then be performed in step 1106 on the amplified analog signal to then center the amplified analog signal to emit scale of ADC. As described above, the baseline adjustment may be determined based on the EFB and/or DFB signals produced based on the detected bit sequences and produced digital signals. Steps 1102 and 1104 allow embodiments of the present invention to take full advantage of the capabilities of the ADC.

Read channel compensation may then be performed in the analog domain to produce a compensated analog signal for the ADC and FIR filter. This read channel compensation may involve MRA compensation, CTF filtering or other read channel compensation known to those having skill of the art. In step 1108 the amplified analog signal will be sampled to produce a digital signal from the amplified analog signal in step 1110. This may be filtered in step 1112 to match signal characteristics for bit detection. Following, a sequence detector such as one using a Viterbi algorithm is used to detect a bit sequence from the compensated digital signal in Step 1114. The DFB signal and/or EFB signal may then be generated based on the detected bit sequence and digital signal in the digital domain in Step 1116. These signals are feedback to the analog domain to improve the overall system performance.

In summary, embodiments of the present invention provide a system and method in which data may be read from a magnetic storage media. An analog signal may be produced by passing a read head over magnetic storage media. This analog signal may be amplified so that the range of the amplified analog signal substantially matches a range of an analog to digital converter (ADC). A baseline adjustment may then be performed on the amplified analog signal to center the amplified analog signal to a midscale of the ADC. The baseline adjustment in embodiments of the invention can be based on an error feedback signal and/or a decision feedback signal. Read channel compensation may then be performed on the amplified analog signal after the baseline adjustment has been applied to produce a read channel compensated analog signal. The read channel compensated analog signal may be sampled with the ADC to produce a digital signal. This digital signal may be filtered to match signal characteristics for bit detection and a bit sequence may then be detected from the filtered digital signal. The EFB signal and/or the DFB signal may be produced in the digital domain based on the digital signal and the detected bit sequences.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions, and alterations can be made hereto without departing from the spirit and scope of the invention as described by the appended claims.

What is claimed is:

1. A system operable to read data from a magnetic storage media comprising:
   a read head, the read head operable to read data from the magnetic storage media and produce an analog signal;
   a variable gain amplifier operable to amplify the analog signal, such that the range of the amplified analog signal substantially matches a range of an analog to digital converter (ADC);
   an offset adjust module operable to substantially center the amplified analog signal to a midscale of the ADC, wherein an offset is based at least one of an error feedback (EFB) signal and a decision feedback (DFB) signal;
   a Magneto Resistive Asymmetry (MRA) correction module operable to MRA correct the amplified analog signal;
   a Continuous Time Filter (CTF) compensation module operable to process the amplified analog signal;
   the ADC operable to sample the amplified analog signal and produce a digital signal;
   a finite impulse response (FIR) filter module operable to perform filtering to match signal characteristic for bit detection;
   a sequence detector operable to process digital signal and detect a bit sequence from the digital signal;
   an EFB loop operable to produce the EFB signal; and
   a DFB loop operable to produce the DFB signal.

2. The system of claim 1, wherein the EFB loop produces the EFB signal based on the digital signal and an error signal, the error signal based on the digital signal and detected bit sequences.

3. The system of claim 1, wherein the EFB loop is operable to produce:
   a first EFB correction applied to the digital signal at an input to the sequence detector; and
   a second EFB correction applied prior to the analog signal prior to the MRA correction module.

4. The system of claim 1, wherein the DFB loop is operable to produce:
   a first DFB correction applied to the digital signal prior to the sequence detector; and
   a second DFB correction applied prior to the analog signal prior to the MRA correction module.

5. The system of claim 1, wherein the EFB signal and the DFB signal comprise digital signals, and wherein the offset adjust module comprises a digital to analog converter (DAC) operable to convert the EFB signal and the DFB signal to an analog offset to be applied to the analog signal prior to the MRA correction module.

6. The system of claim 1, wherein the magnetic storage media is within a Hard Disk Drive (HDD).

7. The system of claim 6, wherein data is written longitudinally or perpendicularly within the HDD.

8. A Hard Disk Drive (HDD) controller operable to read data from a magnetic storage media comprising:
   a read head, the read head operable to read data from the magnetic storage media and produce an analog signal;
   a variable gain amplifier operable to amplify the analog signal, such that the range of the amplified analog signal substantially matches a range of an analog to digital converter (ADC);
   an offset adjust module operable to substantially center the amplified analog signal to a midscale of the ADC, wherein an offset is based on at least one of an error feedback (EFB) signal and a decision feedback (DFB) signal;
   a Magneto Resistive Asymmetry (MRA) correction module operable to MRA correct the amplified analog signal;
   a Continuous Time Filter (CTF) compensation module operable to process the amplified analog signal;

the ADC operable to sample the amplified analog signal and produce a digital signal;

a finite impulse response (FIR) filter module operable to perform filtering to match signal characteristic for bit detection;

a sequence detector operable to process the digital signal and detect a bit sequence from the digital signal;

an EFB loop operable to produce the EFB signal; and a DFB loop operable to produce the DFB signal.

9. The HDD controller of claim 8, wherein the EFB loop produces the EFB signal based on the digital signal and an error signal, the error signal based on the digital signal and detected bit sequences.

10. The HDD controller of claim 8, wherein the EFB loop is operable to produce:
a first EFB correction applied to the digital signal at an input to the sequence detector; and
a second EFB correction applied prior to the analog signal prior to the MRA correction module.

11. The HDD controller of claim 8, wherein the DFB loop is operable to produce:
a first DFB correction applied to the digital signal prior to the sequence detector; and
a second DFB correction applied prior to the analog signal prior to the MRA correction module.

12. The HDD controller of claim 8, wherein the EFB signal and the DFB signal comprise digital signals, and wherein the offset adjust module comprises a digital to analog converter (DAC) operable to convert the EFB signal and the DFB signal to an analog offset to be applied to the analog signal prior to the MRA correction module.

13. The HDD controller of claim 8, wherein the magnetic storage media is within a Hard Disk Drive (HDD).

14. The HDD controller of claim 13, wherein data is written longitudinally or perpendicularly within the HDD.

15. A method to read data from magnetic storage media, comprising:
passing a read head over a magnetic storage media to produce an analog signal;
amplifying the analog signal such that a range of the amplified analog signal substantially matches a range of an analog to digital converter (ADC);
performing a baseline adjustment on the amplified analog signal to center the amplified analog signal to a midscale of the ADC, wherein the baseline adjustment is based on at least one of an error feedback (EFB) signal and a decision feedback (DFB) signal;
performing read channel compensation on the amplified analog signal in an analog domain to produce a read channel compensated analog signal;
sampling the a read channel compensated analog signal with the ADC to produce a digital signal from the amplified analog signal;
filtering the digital signal to match signal characteristic for bit detection;
detecting a bit sequence form the filtered digital signal; and
producing the at least one of the EFB signal and the DFB signal in the digital domain.

16. The method of claim 15, wherein:
the EFB signal and DFB signal are produced in the digital domain; and
the EFB signal and DFB signal are combined; and
the combined EFB signal and DFB signal is processed to produce an analog baseline adjustment.

17. The method of claim 15, wherein the EFB signal and DFB signal are produced in the digital domain and are based on the digital signal and an error signal, the error signal based on the digital signal and detected bit sequences.

18. The method of claim 15, wherein read channel compensation comprises:
Magneto Resistive Asymmetry (MRA) compensation; and
Continuous Time Filter (CTF) compensation.

19. The method of claim 15, wherein the EFB signal is processed to produce:
a first EFB correction applied to the digital signal at an input to the sequence detector; and
a second EFB correction applied prior to the analog signal prior to the MRA correction module.

20. The method of claim 15, wherein the DFB signal is processed to produce:
a first DFB correction applied to the digital signal prior to the sequence detector; and
a second DFB correction applied prior to the analog signal prior to the MRA correction module.

21. The method of claim 15, wherein data is written longitudinally or perpendicularly within the HDD.

* * * * *

UNITED STATES PATENT AND TRADEMARK OFFICE
CERTIFICATE OF CORRECTION

PATENT NO. : 7,768,730 B2  
APPLICATION NO. : 12/032045  
DATED : August 3, 2010  
INVENTOR(S) : William Gene Bliss Page 1 of 1

It is certified that error appears in the above-identified patent and that said Letters Patent is hereby corrected as shown below:

In The Claims:
Col. 14, line 7, in Claim 15: after "the" delete "a"
Col. 14, line 12, in Claim 15: replace "form" with --from--

Signed and Sealed this
Tenth Day of April, 2012

David J. Kappos
*Director of the United States Patent and Trademark Office*